Figure 10:
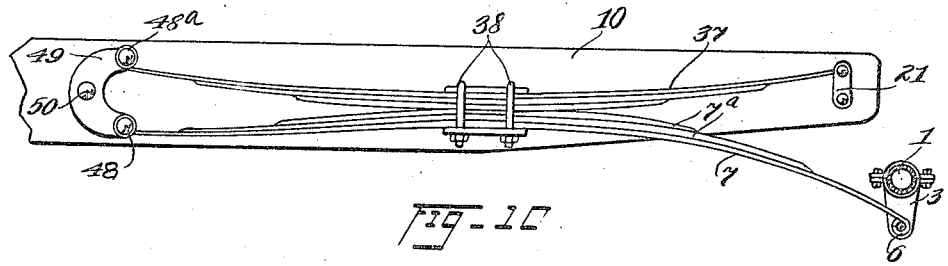

M. M. McINTYRE.
VEHICLE SPRING.
APPLICATION FILED FEB. 21, 1913.
1,229,109.
Patented June 5, 1917.
3 SHEETS—SHEET 1.
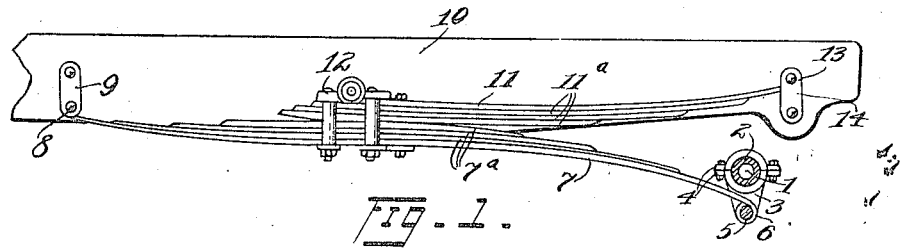
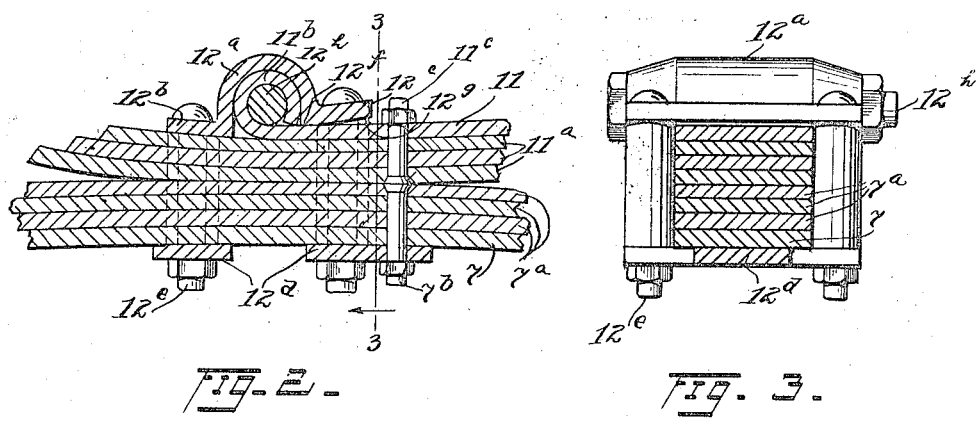
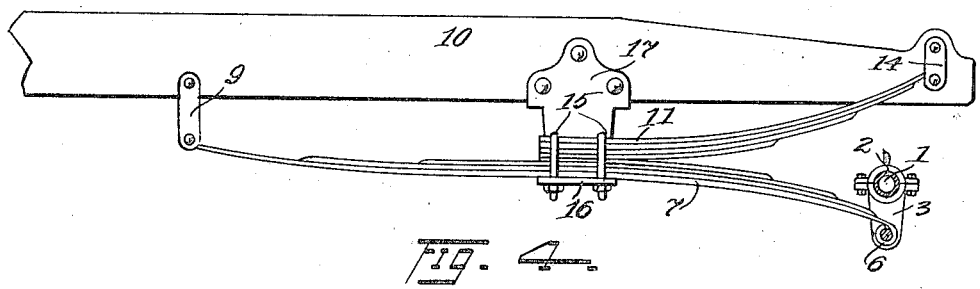
Witnesses:
P. L. Bruck
Brennan B. West
Inventor.
Michael M. McIntyre
By Hull & Smith
Attys

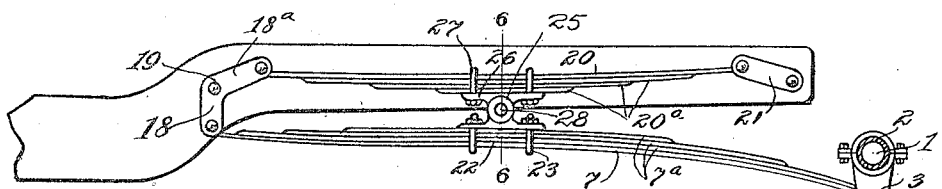

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,229,109.  Specification of Letters Patent.  Patented June 5, 1917.

Application filed February 21, 1913. Serial No. 749,865.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to spring-suspension devices for vehicles and has for its general object to provide a construction and arrangement of spring whereby the shocks incident to striking obstructions are in a great measure absorbed by the springs themselves without transmission to the vehicle and without subjecting the springs and the vehicle to a violent rebounding action, which may, for some purposes, be compared with an explosion. A further object of the invention is to provide a spring suspension whereby ease of riding will be realized alike under light and heavy loads. A still further object of the invention is to secure the above results in and through a spring structure which is comparatively cheap of production. I realize the foregoing objects by the constructions shown in the drawings forming a part hereof, wherein, Figure 1 represents a view in side elevation, certain parts being shown in section, of a spring assembly constructed and applied in accordance with my invention; Fig. 2 represents a sectional detail through the box clip which connects the two sections of the spring assembly; Fig. 3 a sectional view corresponding substantially to the line 3—3 of Fig. 2; Figs. 4 and 5 are views, similar to Fig. 1, of modifications of the construction shown in Fig. 1; Fig. 6 is a sectional detail corresponding to the line 6—6 of Fig. 5; and Figs. 7, 8, 9, 10, 11, 12, and 13 are views, similar to Fig. 1, of other modified forms of my invention.

Describing the various parts by reference characters, and more especially in connection with the form illustrated in Fig. 1, 1 denotes the rear axle of an automobile, and 2 the housing therefor. 3 denotes one of the side members of a suspension frame which may be mounted on the housing 2 by means of clips 4. 5 denotes a pin or bolt connecting the lower ends of the side members 3 and extending through the eye 6 of the main plate of the lower spring section and thereby supporting the lower end of the spring assembly. The spring assembly comprises a lower spring section, the opposite ends whereof are preferably reversely curved or cambered, and an upper spring section. 7 denotes the main plate of the lower spring, the eye 6 whereof is supported by the pin or bolt 5, while the opposite end of the plate is provided with an eye 8 which is supported by the bolt of a shackle 9 pivoted to the vehicle frame 10. It will be noted that the lower spring is substantially straight from the central portion thereof to the end which is connected to the shackle 9, the extreme end having but a slight upward sweep or camber when subjected to the weight of the normally loaded vehicle. 11 denotes the main plate and 11ª the auxiliary plates of a second spring section which is connected to the central portion of the lower spring section as by means of a box clip 12, the spring section 11, 11ª and the right hand end of the lower spring section being placed back to back, with a V-shaped opening therebetween whereby they may gradually cushion upon each other and increase their joint capacity as the load increases. The rear end of the spring section 11, 11ª is provided with an eye 13 which receives the bolt of a shackle 14 carried by the frame 10 and projecting upwardly from its pivotal support. The ends of the plates 11, 11ª project beyond the clip 12 a distance which gradually decreases from bottom to top, whereby a cushioned pressure is exerted by these ends upon the lower section as the frame 10 recedes from the axle and the upper spring section reaches and passes its normal camber; *i. e.* the camber which it possesses when unsubjected to any load.

As will appear more particularly from Figs. 2 and 3, the upper and lower spring sections are so connected that these sections can rock upon each other and the cushioning action on rebound be greatly facilitated thereby. The clip 12 comprises a top plate having a central housing 12ª and forwardly and rearwardly extending lateral flanges 12ᵇ and 12ᶜ, respectively, these flanges being connected to cross plates 12ᵈ by means of bolts 12ᵉ. The flange 12ᶜ is provided with a short gripping surface 12ᶠ, immediately adjacent to its junction with the housing 12ᵃ, and from this gripping surface (which may be from ⅛ to ¼ inch in length) the under surface of the flange 12ᶜ is inclined upwardly toward the rear, as shown at 12ᵍ. The main plate 11 is provided with an eye 11ᵇ, which is received within the housing 12ᵃ and is connected to said housing by means of a bolt 12ʰ mounted in said housing. The plates of the spring 11, 11ᵃ are connected by means of a through bolt 11ᶜ and the plates of the lower spring section are connected by a similar bolt 7ᵇ.

By the construction shown and described, it is evident that the spring sections are capable of a rocking motion, the one on the other. On the upward movement of the spring section 11, 11ᵃ, as on rebound, this spring section is pivoted on the eye 11ᵇ, and a long rocking bearing is provided between the sections, the cushioning effect referred to hereinbefore being secured by the projecting ends of the plates 11, 11ᵃ and the rocking motion being facilitated by the construction of the clip 12, including the inclined surface 12ᵍ of the flange 12ᶜ.

Owing to the shackle connection between the ends of the spring and the vehicle frame, radius or driving rods will preferably be provided with the construction shown. Where such rods are provided the suspending frame comprising the plates 3 may be free to rotate or swing with respect to the axle 1. For efficiency in driving, I prefer to have the rear end of the upper spring section at the rear of the axle.

In operation, suppose an obstacle is encountered. The upward movement of the axle will cause the spring 11, 11ᵃ and the right hand end of the spring 7, 7ᵃ to cushion and elongate against each other. Owing to the manner of constructing the springs and of connecting them to the vehicle frame, the shock incident to encountering this obstacle will be cushioned and absorbed in the spring, with practically no transmission to the vehicle frame and with practically no liability to a disruptive or explosive rebound action, the recovery of the spring parts to normal position after such deflection being slow and gradual.

In Fig. 4 there is shown a construction wherein substantially the same form of spring is illustrated as in Fig. 1, the manner of suspending the spring differing therefrom in some respects. In this view, 1 denotes the axle, 2 the housing, and 3 the side members of the hanger frame. The lower spring section, 7, 7ᵃ is substantially identical with the like-designated spring in Fig. 1.

At its front end, the spring 7, 7ᵃ is connected to the bottom of a downwardly swinging shackle 9 and the upper end of the spring section 11, 11ᵃ, is also connected to the lower end of an upwardly projecting shackle 14, said shackles being carried by the frame 10.

The spring sections 7, 7ᵃ and 11, 11ᵃ are connected by means of clips 15, the lower ends of which project through a spring seat 16, said seat being carried by a bracket 17 secured to the frame 10. In the construction shown in Fig. 4, the radius or driving rods will be unnecessary, provided that the frame members 3 are substantially rigid with the housing or axle.

In Figs. 5 and 6 there is shown a further modification of my spring suspension, wherein the lower spring section 7, 7ᵃ is substantially identical with the like-designated spring sections in the preceding modifications, the connection between the right hand or downwardly directed end of the spring and the axle being the same as shown in Figs. 1 and 2. The left or upper end of this spring section is connected to the lower arm 18 of a bell crank shackle pivoted to the frame 10 at 19, the parts being preferably arranged so that the arm 18, when the vehicle is under normal load, projects vertically downward. The upper spring section consists of a substantially straight tension spring 20, 20ᵃ, similar to the upper spring sections shown in my application No. 741,640, filed January 13, 1913. This upper spring section has one end connected to a shackle 21 and its other end connected to the arm 18ᵃ of the bell crank shackle. The shackles 18ᵃ and 21 project toward each other almost in a straight line, permitting but a limited movement of the central portion of the spring 20, 20ᵃ. The spring sections 7, 7ᵃ and 20, 20ᵃ are each provided with a spring seat, and these seats are pivotally connected. The spring seat 22 is secured to the spring section 7, 7ᵃ by means of the clips 23. This seat is provided with a central hinge lug 24 which projects between two hinge lugs 25, carried by the spring seat 26 which is secured to the spring section 20, 20ᵃ by clips 27. A pintle 28 extends through the lugs 24 and 25 and pivotally connects the same and the spring sections.

The action of the spring construction illustrated in Figs. 5 and 6 is in some respects the same as, but in others markedly different from, that which occurs in connection with the modifications shown in Figs. 1 and 2. A shock, such as caused by the wheel encountering an obstacle, will elevate the rear end of the spring 7, 7ᵃ and, because of the pivotal support of the center of the spring, will produce a downward and rearward pull upon the shackle arm 18 and an upward and forward thrust upon the shackle arm 18ᵃ, thereby so shifting the connections between the upper spring section and the frame that there is a slight fall of the rear end of the frame until the tension on the shackle arms 18, 18ª is again balanced. During this falling interval, the thrusting action of the spring upon the frame is entirely suspended, and the vehicle is, therefore, relieved of the initial shock which would otherwise be transmitted thereto, and a part of the blow is absorbed and lost in the spring construction itself without being transmitted to the vehicle frame. Furthermore, any upward thrust of the lower spring section against the upper spring section will produce a limited bowing or "arcing" of the center of the upper spring section. The upward movement of the upper spring section is necessarily limited, owing to the fact that it forms a flexible tension device extending in a substantially straight line between the shackled arm 18ª and the shackle 21. During this "arcing" of the upper spring by the upward deflection of its center, there will be a dissipation of the vibration throughout the entire spring assembly without subjecting the vehicle to a violent rebounding action, as would be the case were the center of the lower spring section connected directly to the frame.

The construction shown in Figs. 5 and 6 may be used without radius rods, the spring assembly constituting a flexible drive between the axle and frame. In Fig. 7 there is shown a spring construction which is similar in general characteristics to that shown in Fig. 1 and which is capable of realizing substantially the same results as the construction shown in Fig. 1. The lower spring section 7, 7ª has its rear end connected to the axle 1 in the same manner as shown in Figs. 1, 4 and 5. As is the case with the prior forms of my invention, the front end of the spring is substantially straight, but is preferably cambered slightly in a reverse direction from the rear end and is connected to a downwardly swinging shackle 36. The lower spring section is connected at its center to an upper spring section 37, 37ª by means of clips 38. The rear end of this upper spring section is supported from the frame 10 by means of an upwardly swinging shackle 39, while its front end is pivotally connected to the upper end of a long shackle 40, the lower end whereof is supported from the rear end of a short spring hanger 41 which is carried by the frame 10 and is preferably secured to the lower surface thereof. For purposes of compactness, the shackle 36 may swing within the side plates of the shackle 40 and be pivoted to the same shackle bolt 42 to which the front eye of the spring section 37, 37ª is connected.

The operation of the spring shown in Fig. 7 is substantially the same as that shown in Fig. 1. The front end of the upper spring is permitted to move upwardly under the influence of a shock, this upward movement being permitted by the spring hanger 41. Instead of securing the temporary break or suspension of connection between the spring and frame which is secured by the construction of Fig. 5, there is a yielding or softening of the blow, which is analogous to the breaking action referred to.

In Fig. 8 the construction is substantially the same as that shown in Fig. 7. In the latter view, however, the main plate 7 is provided with an upwardly extending scroll end 7ᶜ which is connected to an upwardly extending shackle 43, which may be conveniently mounted on the same pin 44, which connects the front eye of the spring 37, 37ª to the upwardly extending shackle 45, the lower end whereof is pivoted to the spring hanger 41. The provision of the scroll end 7ᶜ enhances the shock absorbing qualities of the spring assembly.

In Fig. 9, there is shown a construction which is analogous to that of Fig. 8, the front end of the main plate 37 of the upper spring section 37, 37ª being provided with a downwardly extending scroll 37ᵇ having its eye connected to the upper end of a shackle 46, the lower end whereof is connected to the spring hanger 41. In this case, moreover, the front end of the spring section 7, 7ª is connected to an upwardly extending shackle 47 which may be pivoted to the frame 10. The action of this spring is very similar to that shown in Fig. 8.

In Fig. 10 there is shown a spring assembly and construction which is identical with that of Fig. 7 except as to the connections between the front ends of the spring sections and the frame 10. The front ends of these sections are connected to the opposite rearwardly projecting ends 48, 48ª of a U shaped lever 49, which is pivoted at its central portion to the frame, as indicated at 50. With this construction, when a shock is encountered which tends to move the bottom of the lever rearwardly, the top will be moved upwardly, with the result that the front end of the upper spring section will be moved upwardly and the rear end of the frame will drop a short distance, with a breaking or cushioning effect analogous to that produced by the construction and assembly shown in Fig. 5.

Figure 11:
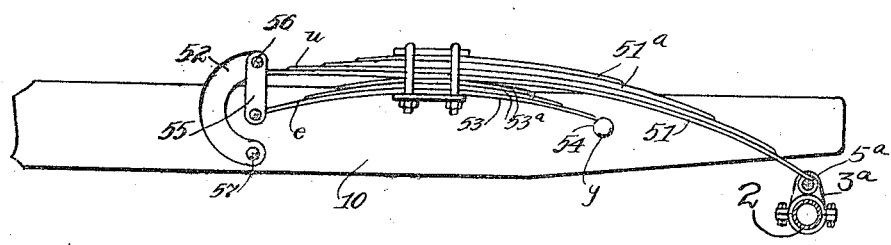

In Fig. 11, 1 denotes the rear axle, 2 the housing and 3ª the upwardly projecting side plates of the spring-hanger axle connection. 51 denotes the main plate and 51ª the auxiliary plates of an upper spring section the rear end whereof is connected to the rear axle by the hanger bolt 5ª. The right hand end of the spring section 51, 51ª is downwardly cambered while its left hand or front end is comparatively short and substantially straight and is connected to the upper end of a curved or U shaped shackle 52. 53, 53ª denotes a lower spring section having its main plate at the bottom and having its rear end connected to the frame 10 by means of a suitable pin or bolt 54, while its front end is connected to a shackle 55 which may be conveniently suspended from the bolt or pin 56 to which the front end of the upper spring section 51, 51ª is secured.

With the construction shown in the last described figure, the suspension is from the shackle pivot 57, the pivot 54 and the axle 1. The front ends of the upper and lower spring section are free, affording a flexible drive from the axle to the frame. In operation, when an obstacle is encountered, the spring assembly will pivot about the point 54, whereby the advantages secured through the construction in Fig. 7 will be obtained. When the spring section 51, 51ª moves toward the front (as it will under shock) the whole spring construction is pivoted at its front and yields as a whole with respect to the frame, giving the effect of a yielding or graduated breaking connection between the spring and the frame, whereby the initial shock will be practically suspended and untransmitted to the frame.

Figure 12:
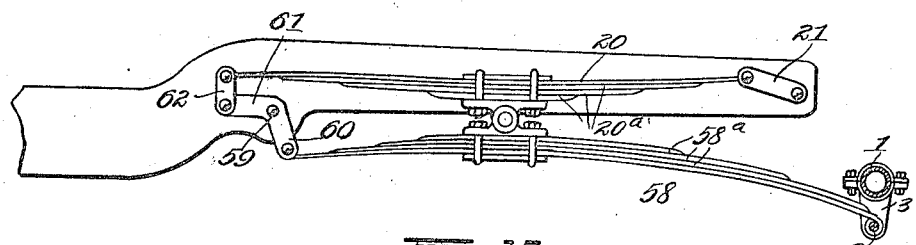

In Fig. 12, there is shown a form of my invention which is similar to that illustrated in Fig. 5, but differing therefrom in the following particulars:—The front end of the lower spring section 58, 58ª is curved or cambered in the same direction as the rear end, whereas the front end of this spring section is shown in Fig. 5 as curved or cambered in the reverse direction from the rear end. The upper spring section 20, 20ª is identical with the upper spring section in the preceding figure and has its rear end connected to a shackle 21, as in Fig. 5. Furthermore, the two spring sections are connected pivotally at their centers in the same manner as shown in Fig. 5. The front end of the lower spring section is connected to the lower arm of an angle lever pivoted at 59. The lower arm of this angle lever extends downwardly and somewhat rearwardly, as shown at 60. The other arm 61 of this lever extends almost directly forward from the pivot 59, and the front end of the spring 20, 20ª is connected to the front end of the lever arm 61 by means of an upwardly extending shackle 62. While the rocking of the bell crank lever or shackle which causes a temporary break of connection between the spring and the frame is accomplished by the contraction of the front end of the spring 7, 7ª in Fig. 5, the rocking of the angle lever in Fig. 12 to secure the same result is caused by the expansion or elongation of the front end of the lower spring section 58, 58ª. When an obstacle is encountered and the rear end of the lower spring section moves upwardly, the front end elongates, moves the lever arm 60 forward and throws the lever arm 61 and the attached front end of the spring section 20, 20ª upwardly, thereby dropping the rear end of the spring 20, 20ª and allowing a falling movement of the vehicle frame, or a temporary break of connection between the spring and the frame, with the advantageous results referred to in connection with the construction shown in Fig. 5.

Figure 13:
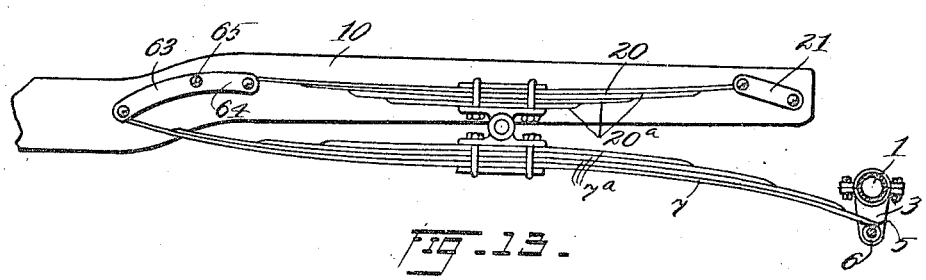

In Fig. 13, there is shown a further modification of my invention which is capable of realizing the advantages secured in and by the construction shown in Fig. 5. In this view, the upper and lower spring sections 7, 7ª and 20, 20ª are substantially identical as to construction and mode of connection with those shown in Fig. 5. The front end of the lower spring section is reversely curved or cambered from the rear end and is connected to the forwardly and downwardly extending end of a lever which is pivoted intermediate of its ends in such manner that the front and lower arm 63 is longer than the rear and upper arm 64, the pivot point being indicated at 65. The front end of the lower spring section 7, 7ª is a short distance below and considerably in front of the corresponding end of the upper section 20, 20ª. With this construction, when an obstacle is encountered, the upward movement of the rear end of the spring 7, 7ª causes a downward movement and a contraction of the front end of the spring section, causing a rearward and downward movement of the lever arm 63 and an upward movement of the lever arm 64, producing a corresponding upward movement of the front end of the spring 20, 20ª and a downward movement of the rear end, whereby the connection between the spring assembly and the vehicle frame is temporarily suspended or broken.

Having thus described my invention, what I claim is:

1. The combination, with a vehicle frame and axle, of a spring having a downturned end connected with the axle, a shackle connecting the opposite end of the spring to the frame, a substantially straight spring having its center pivotally connected to the center of the first mentioned spring, and shackles connecting the ends of the second spring to the frame.

2. The combination, with a vehicle frame and axle, of a spring having an end connected with the axle, means connecting the opposite end of the spring to the frame, a substantially straight spring having its center connected to the center of the first mentioned spring, and means connecting the ends of the second spring to the frame.

3. The combination, with a vehicle frame and axle, of a spring having a downturned end connected to the axle, a shackle connecting the opposite end of the spring to the frame, a tension spring connected to the frame and having a limited vibratory movement at the central portion thereof, and means pivotally connecting the central portions of the two springs.

4. The combination, with a vehicle frame and axle, of a spring having an end connected to the axle, means connecting the opposite end of the spring to the frame, a tension spring connected to the frame and having a limited vibratory movement at the central portion thereof, and means connecting the central portions of the two springs.

5. The combination, with a vehicle frame and axle, of a spring having one end connected with the axle and having its other end connected to the frame, a second spring having its opposite ends connected to the frame, and a rocking connection between the central portions of said springs.

6. The combination, with a vehicle frame and axle, of a spring having one end connected with the axle and having its other end pivotally connected to the frame, a second spring having its opposite ends pivotally connected to the frame, and a pivotal connection between the central portions of said springs.

7. The combination, with a vehicle frame and axle, of a spring having one end connected to the axle and its other end connected to the frame, a tension spring having its opposite ends connected to the frame, and a pivotal connection between the central portions of said springs.

8. The combination, with a vehicle frame and axle, of a spring having one end connected to the axle and its other end pivotally connected to the frame, a tension spring having its opposite ends pivotally connected to the frame, and a pivotal connection between the central portions of said springs.

9. The combination, with a vehicle frame and axle, of an angle lever pivoted to the frame, a spring having one end connected to the axle and its other end connected to one arm of said lever, an upper spring having one end connected to the other arm of the lever and its other end connected to the frame, and means connecting the central portions of said springs.

10. The combination, with a vehicle frame and axle, of a bell crank shackle pivoted to the frame, a spring having one end connected to the axle and its other end connected to the lower arm of said shackle, an upper spring having one end connected to the other arm of the shackle and its other end pivotally connected to the frame, and means pivotally connecting the central portions of said springs.

11. The combination, with a vehicle frame and axle, of an angle lever pivoted intermediate of its ends to the frame, a spring having one end connected to the axle and its other end to the lower arm of said lever, a second spring having one end connected to the other arm of the lever and its opposite end to a shackle on the frame, and means connecting the central portions of said springs.

12. The combination, with a vehicle frame and axle, of an angle lever pivoted intermediate of its ends to the frame, a spring having one end connected to the axle and its other end to an arm of said lever, a second spring having one end connected to the other arm of the lever and its opposite end connected to a shackle carried by the frame, the shackle and lever arm to which the second spring is connected projecting toward each other and said spring being substantially straight, and means pivotally connecting the central portions of said springs.

13. The combination, with a motor vehicle frame and axle, of a driving member having its opposite ends connected to the frame and axle, and a spring interposed between said member and the frame.

14. The combination, with a motor vehicle frame and axle, of a driving member connecting the frame and axle, and a spring connected to the frame and having a rocking connection with the driving member.

15. The combination, with a vehicle frame and axle, of a spring having one end connected to the axle and its other end flexibly connected to the frame, of a second spring having a rocking connection with the first spring and having an end flexibly connected to the frame.

16. The combination, with a vehicle frame and axle, of two spring sections pivotally connected at their central or body portions and having their rear ends connected respectively to the frame and axle, and a lever pivoted intermediate of its ends and having its opposite arms connected to the front ends of said spring sections.

17. The combination, with a vehicle frame and axle, of two spring sections pivotally connected at their central or body portions and having their rear ends connected respectively to the frame and axle, and a lever pivoted intermediate of its ends and having its opposite arms connected to the front ends of said spring sections, the lever being so constructed and pivoted that a rearward movement of its lower arm will produce an upward movement of its upper arm to elevate the front end of the upper spring section.

18. The combination, with a vehicle frame and axle, of an upper and a lower spring section, means connecting one end of the lower section to the axle and its opposite end to the frame, means connecting the upper section to the frame, and a rocking connection between the upper section and the central portion of the lower section, said sections being arranged back to back.

In testimony whereof, I hereunto affix my signature in the presence of two witnesses.

MICHAEL M. McINTYRE.

Witnesses:
P. A. CONNOLLY,
CHRISTIAN GIRL.